(12) United States Patent
Grandhi

(10) Patent No.: US 10,733,658 B2
(45) Date of Patent: Aug. 4, 2020

(54) METHODS AND SYSTEMS OF DISCOVERY OF PRODUCTS IN E-COMMERCE

(71) Applicant: Roopnath Grandhi, Sunnyvale, CA (US)

(72) Inventor: Roopnath Grandhi, Sunnyvale, CA (US)

( * ) Notice: Subject to any disclaimer, the term of this patent is extended or adjusted under 35 U.S.C. 154(b) by 227 days.

(21) Appl. No.: 15/828,420

(22) Filed: Nov. 30, 2017

(65) Prior Publication Data

US 2018/0349981 A1    Dec. 6, 2018

Related U.S. Application Data

(63) Continuation-in-part of application No. 14/830,696, filed on Aug. 19, 2015, now abandoned.

(60) Provisional application No. 62/039,884, filed on Aug. 20, 2014.

(51) Int. Cl.
*G06Q 30/06* (2012.01)
*G06F 16/958* (2019.01)
*G06F 16/9535* (2019.01)

(52) U.S. Cl.
CPC ....... *G06Q 30/0633* (2013.01); *G06F 16/958* (2019.01); *G06F 16/9535* (2019.01); *G06Q 30/0625* (2013.01)

(58) Field of Classification Search
CPC .................................................. G06Q 30/60
USPC ..................................................... 705/26–27
See application file for complete search history.

(56) References Cited

U.S. PATENT DOCUMENTS

| 7,818,399 | B1* | 10/2010 | Ross, Jr. | G06Q 30/06 709/218 |
| 2008/0104061 | A1* | 5/2008 | Rezaei | G06Q 10/02 |
| 2009/0187466 | A1* | 7/2009 | Carter | G06Q 30/02 705/7.34 |
| 2010/0088148 | A1* | 4/2010 | Presswala | G06Q 30/02 705/7.29 |
| 2015/0339752 | A1* | 11/2015 | Chetuparambil | G06Q 30/0256 705/26.62 |

OTHER PUBLICATIONS

PerfectFit systems pvt. ltd.; researchers submit patent application, "method and system for on demand production of apparels", for approval (USPTO 20190125022). (May 20, 2019). Journal of Robotics & Machine Learning. (Year: 2019).*

* cited by examiner

*Primary Examiner* — Marissa Thein
*Assistant Examiner* — Latasha D Ramphal

(57) ABSTRACT

In one aspect, a computerized method for assisting a user in a real-life shopping situations includes the step of receiving an extracted a list of shopping intents in a computer with a memory. With at least one processor of the computer implementing the following steps are implemented. The process extracts the list of shopping intents from the memory. The process hierarchically organizes the list of shopping intents. The process maps a shopping intent to one or more products using a set of web-scale unstructured data. The process receives a product search query. The process parses the product search query. The process matches the product search query with at least one shopping intent. The process uses a matched product search query and at least one shopping intent to obtain a set of products to return as a search result.

11 Claims, 15 Drawing Sheets

METHODS AND SYSTEMS OF DISCOVERY OF PRODUCTS IN E-COMMERCE

CROSS-REFERENCE TO RELATED APPLICATIONS

This application is a claims, priority from U.S. Provisional Application No. 62/039,884, titled METHODS AND SYSTEMS OF DISCOVERY OF PRODUCTS IN E-COMMERCE and filed 20 Aug. 2014. This application is hereby incorporated by reference in its entirety. This application is a claims priority from U.S. provisional application Ser. No. 14/830,696, titled METHODS AND SYSTEMS OF DISCOVERY OF PRODUCTS IN E-COMMERCE and filed 19 Aug. 2015. This application is hereby incorporated by reference in its entirety.

FIELD OF THE INVENTION

The invention is in the field of data analytics and more specifically to a method, system and apparatus of methods and systems of discovery of products in e-commerce.

Description of the Related Art

In one example, a user may be shopping for dresses with the following intent: "dresses to wear for a summer wedding that make me look taller and are under 100 dollars". In this example, the user may have a specific shopping situation here and current mechanisms to discover the appropriate products are very time-consuming. Users may have various options. For example, the user may search in online retail stores. However, this may not yield any relevant results a the results are primarily based on matching keywords. The user may search in web search engines that would point to blogs and articles about what may be relevant to the user's specific situation. One issue with this approach is that it is tough to always find articles that match the specific situation of the user. This approach can also be a time-consuming process of researching various articles on the mobile phone. If the user is in a mall or a retail store looking to find relevant products, it is not practical for the user to perform this kind of research.

The user can research on various social bookmarking sites to determine if other users with similar situations have posted about relevant products. This process can also be time-consuming research process and would not be to practical when the user is time-pressed to find products or is in a store looking to find the relevant products.

The user can request the help of a sales associate or personal shopper in a store to help find the appropriate products. However, it may be difficult to locate experts who are knowledgeable about: the current shopping situation and it is not feasible to scale this approach. Additionally, there are only limited number of sales associates and/or personal shoppers compared to millions of shoppers at any given time.

As seen, current options for discovering products relevant to specific real life shopping situations are time-consuming. Accordingly, various needs to assist a user in organizing products around real life shopping situations.

SUMMARY OF INVENTION

In one aspect, a computerized method for assisting a user in a real-life shopping situations includes the step of receiving, an extracted a list of shopping intents in a computer with a memory. With at least one processor of the computer implementing the following steps are implemented. The process extracts the list of shopping intents from the memory. The process hierarchically organizes the list of shopping intents. The process maps a shopping intent to one or more products using a set of web-scale unstructured data. The process receives a product search query. The process parses the product search query. The process matches the product search query with at least one shopping intent. The process uses a matched product search query and at least one shopping intent to obtain a set of products to return as a search result.

Figure 1:
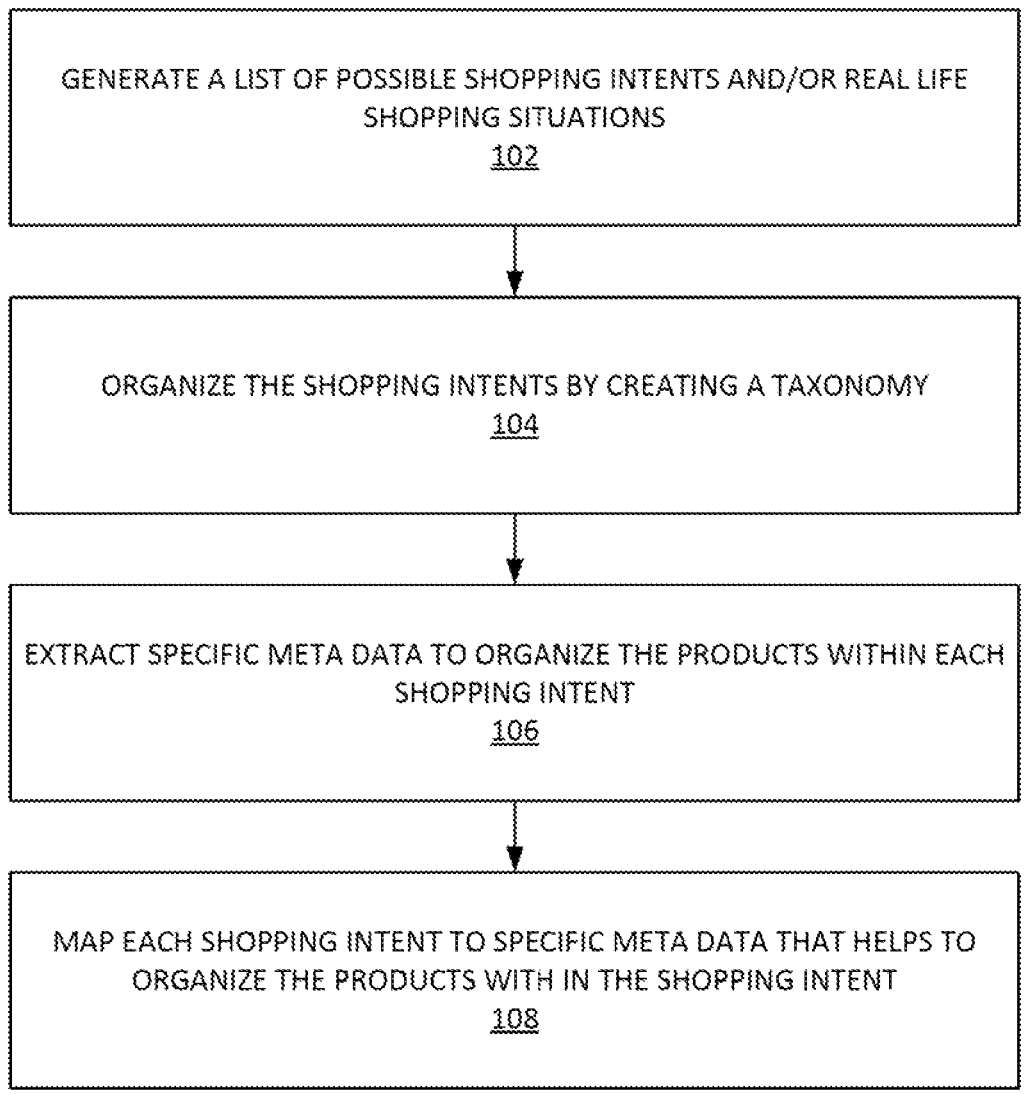
FIG. 1 illustrates an example process for the discovery of products it e-commerce, according to some embodiments.

The Figures described above are a representative set, and are not an exhaustive set with respect to embodying the invention.

DESCRIPTION

Disclosed are a system, method, and article of manufacture of the discovery of products in e-commerce. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

E-commerce (e.g. electronic commerce) can include trading in products and/or services using computer networks, such as the Internet. E-commerce can draw on technologies such as mobile commerce, electronic funds transfer, supply chain management, Internet marketing, online transaction processing, electronic data interchange (EDI), inventory management systems, and automated data collection systems.

Inference Engine can be an Artificial intelligence tool (e.g. an expert system).

Information retrieval can be the activity of obtaining information resources relevant to an information need from a collection of information resources. Searches can be based on metadata or on full-text (or other content-based) indexing. Example information retrieval methods that can be implemented herein include, inter alia: expert search finding, genomic information retrieval, geographic information retrieval, information retrieval in software engineering, and/or vertical search.

Machine learning can include the construction and study of systems that can learn from data. Example machine learning techniques that can be used herein include, inter alias: decision tree learning, association rule learning, artificial neural networks, inductive logic programming, support vector machines, clustering, Bayesian networks, reinforcement learning, representation learning, similarity and metric learning, and/or sparse dictionary learning.

Mobile device can include smart phones, cell phones, personal digital assistants, tablet computers, wearable computers, smart watches, smart glasses (e.g. Google Glass®), etc.

Natural language processing (NLP) can include natural language understanding and other algorithms that enable computers to derive meaning from human and/or other natural language input. NLP can also provide for natural language generation (e.g. convert information from computer databases into readable human language).

Exemplary Process

Shopping products can be organized around various shopping categories such as, inter alia, men's clothing, children watches, toys and games etc. This would be helpful to have a broad classification and category structure so that users with vastly different shopping needs can still find the appropriate products under the appropriate category. Though this type of classification and categories is beneficial for retailers to help as many users discover the products, this is very inefficient for users to find the appropriate products in a quick manner as there could be large number of products under any category. Some retailers and/or shopping search engines provide the following ways to navigate the products: sub-categories to help navigate the products. For example, under men's clothing there could be men's trousers and men's shirts etc.; and/or related search keywords and attributes.

Though the above methods can help find and discover the appropriate items, it may still be tough to find appropriate products especially when users do not have enough time to research products to purchase. These problems are magnified when the user is using a mobile device (e.g. a smart phone, a tablet computer, a wearable computing device such as one with an optical head-mounted display (OHMD), etc.) to locate the shopping products. This may be due to such factors as smaller user interfaces (e.g. small screens, etc.).

Users often have a specific shopping intentions when they shop. Example shopping intentions include, inter alia: organizing and/or hosting a birthday party for a child; travelling to a beach vacation; giving a bath to newborn baby; toys to teach/aid a baby to crawl; attending a job interview; engaging a child during a long road trip; and/or painting a room. Users typically shop for their intended products by doing research on several retail sites with different keywords. Each shopping intent or situation can have multiple sub-shopping needs. The methods and systems provided herein can help organize and/or group products according to user shopping intentions and/or real-life shopping needs. Metadata specific to the shopping need can be extracted and used to assist shopping research performed on mobile devices. A customized taxonomy can be created according to the shopping intentions. For example, taxonomies based on a shopping intention of a birthday party for a child can include, inter alia; 'birthday decoration supplies'; 'birthday party theme'; 'birthday party dress for the child'; 'goody bag/return gifts for children attending the party'; and/or 'age of the children attending the party'. Each sub-shopping intention can be further customized by how users shop the sub-context. For example, 'goody bags' are often assembled according to the age of the children attending the party and/or the budget parents have for each goody bag.

FIG. 1 illustrates an example process 100 for the discovery of products in e-commerce, according to some embodiments. In step 102 of process 100, a list of users can convert the shopping context or intent into series of search keywords into the search engine of retailers to find appropriate products. Retailers manage the search keywords in conjunction with the taxonomy as the primary mechanism of ranking and navigating the products. Comments, reviews and/or blogs which are publicly available information can be analyzed to understand the shopping needs of the users and discover real life shopping situations. For example, users may have a specific shopping intent in mind. Shopping intentions can be converted into series of keyword searches to discover products on retail sites or search engines. The retailers have a way to organize products but it is very broad and not targeted to the shopping intent. Accordingly, various different sources can be mined to automatically determine the possible shopping intents. Rather than having generic sub categories, the products can be organized by shopping intents into taxonomy.

In step 104, the shopping intents can be organized by creating a taxonomy system. For example, shopping intents can be organized into taxonomy by using multiple signals including input by humans and analysing unstructured data sources. In step 106, specific metadata that are used to organize the products within each shopping intent can then be extracted. In step 108, each shopping intent can be mapped to specific metadata that can assist in organizing products within the shopping intent. For example, recommendations can be provided for birthday supplies (e.g. a 'birthday theme'). It is noted that in some example embodiments, process 100 and process 1200 (infra) can be integrated in whole and/or in part.

Exemplary Systems and Computer Architecture

Figure 2:
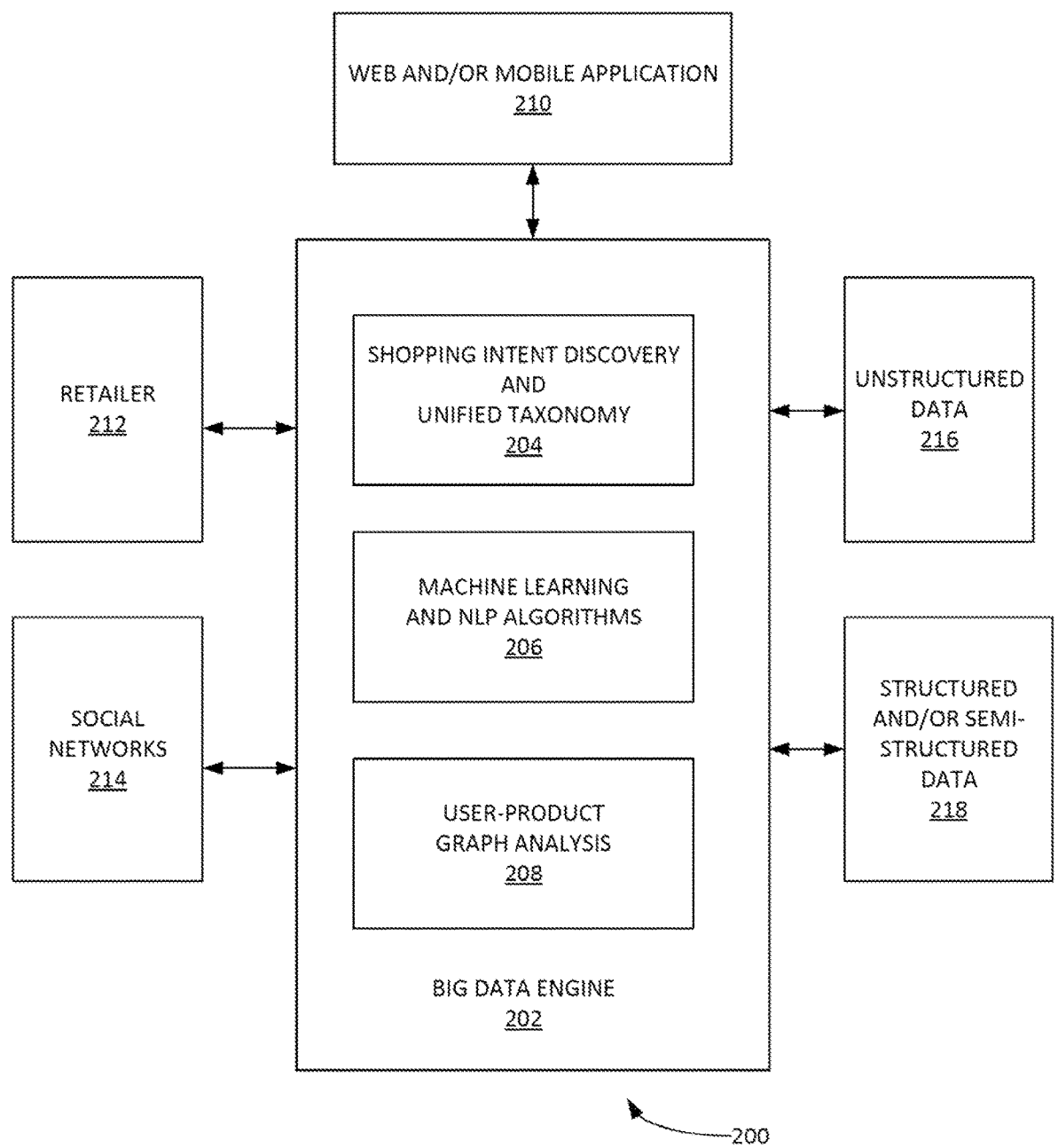
FIG. 2 illustrates, in block diagram format, an example system for the discovery of products in e-commerce, according to some embodiments.

FIG. 2 illustrates, in block diagram format, an example system 200 for the discovery of products in e-commerce, according to some embodiments. System 200 can be used to implement process 200. System 200 can map user search queries to shopping intents. System 200 can create a specialized experience for each specific shopping intent. System 200 can be used to implement the following systems and methods such as a gift recommendation engine. Gift buying can be an important social concept and many users buy gifts on different occasions like birthday parties, housewarmings, etc. System 200 can recommend the right type of gifts appropriate for the recipient depending upon the event and also recommend them at the last minute to the party. For example, for a user attending a birthday party and is on the way to a birthday party, system 200 can recommend the appropriate gifts to purchase and also recommend the right stores to buy on the way to a party so that user can save the time. This could also be applicable to any kind of parties or events user attends like housewarmings, baby shower, Christmas parties, get together parties, barbeques, potlucks, etc. System 200 can determine the location of the event or party and based on the current location and the destination route and directions, it scans all the appropriate stores and recommends the right stores and products to buy on the way to the party. The user could order the product and pick it up gift wrapped in a store.

System 200 can manage the delivery of a gift to the user at an agreed upon location. For some examples, the user might not have sufficient time to stop at a store and pick it up, the system can delegate personal shoppers who would purchase the gifts, gift wrap the products and deliver them to the user at an agreed upon location near the party or on the way to the party. System 200 can map personal shoppers to each user's request so that their travel itineraries. For example, travel itineraries are optimized for cost and time. Accordingly, system 200 can optimize pick up routes such that there is less cost associated with the travel route of the personal shopper. In another scenario, when a user is attending a housewarmings party, the user can enter the home address where the party is, system 200 can analyze publicly available property details such as, inter alia: whether it is an apartment or house; what other features are there like swimming pool; the size of the house; and/or other factors. System 200 can use this information to recommend appropriate gifts for the party.

System 200 can be used to provide accurate toy recommendations based on the age and/or gender of a child. For example, many retailers use the age classification criteria provided by the manufacturer as the criteria to recommend the toys based on the age of the child. However the age guidance provided by manufacturers may be not necessarily be accurate and generally broad. For example, in the picture shown is a puzzle toy which has manufacturer age recommendations of six through ten (6-10). However this is generally a complex puzzle which is rarely used for six (6) year old children. Parents generally depend on the age/gender rating available on the manufacturer's box to assume that the toy is relevant for that age group child.

System 200 can extract the accurate relevance of the toy for different ages and gender of the child. System 200's advanced text processing algorithms analyze reviews and/or blogs to deduce the purchase intent of parents. For example, if the parent leaves a product review which has following text: "I bought it for my 8 year old boy and he enjoys solving this puzzle." System 200 accurately extracts from this unstructured text that the toy is useful for 8-year old child. Using natural language processing techniques (e.g. as provided infra) system 200 can extract the sentiment of the review and/or extract an age/gender relevance distribution for each toy (e.g. using multiple other factors like rating of the review etc.

In one example, a toy can have a manufacturer age recommendation range of 6-10. Many retailers recommend this toy as a top rated gift for 6 year old child. Methods of skill extraction for a toy can also be implemented. Along with the age/gender relevance, system 200 can also extract the right skills the child would develop upon the usage of this toy. Several skills can be discovered by processing the reviews and/or other text content and then mapped to each toy. Some of the skills extracted include "problem solving", "addition and subtraction", "touch and fees", "learning the time" etc.

Methods of accurate voice-based shopping search can be implemented. System 200 can use NLP and/or various machine learning techniques to interpret the context and intent of the user and provide accurate recommendations (e.g. with respect to voice-based search query). A taxonomy of shopping intents and/or real life shopping can be generated. System 200 can organize the content on a real-life shopping context like "gift for a child" etc. Customers generally do shopping research on products where they don't have an idea of which product to purchase and which are the right keywords to type. Using the context of their higher level intent, system 200 can interpret the shopping need and navigates the user through various recommendations.

Methods of combining user voice information with context of a shopping application implemented by system 200 are now provided. Using a context-based voice assisted search, system 200 can interpret context efficiently. For example, system 200 can include a default voice-based input from the shopping application. System 200 can utilize voice-based input from different screens of the shopping application. For example, a user may be looking at the product details screen on the application, user can ask any questions about the product like "is this toy suitable for a 5 year old boy? Though user didn't indicate what the actual toy is, since the user have activated the voice search from product details page. System 200 automatically interprets and analyzes the output in the context of the product currently being viewed by the user. This type of multi-context input helps to analyze and provide rich context to the voice-based input and helps provide more accurate answers or recommendations.

Methods of combining shopping research tips/guides and articles along with product information are now provided. System 200 can include a web-crawler functionality that crawls multiple web sources like reviews, comments, blogs, articles etc. System 200's advanced matching and classification algorithms match and analyze the articles/research guides to each product category and different product attributes of each category. When the user of a shopping application is supported by searches for a product like stroller, along with various stroller products, system 200 can provide die list of articles and/or content to educate the shopper about the strollers. System 200 can also summarize and/or extract the key points form these articles to help the user to quickly become educated about the product.

Methods of matching video reviews/descriptions to a product video are now provided. Often a video describing how the product is used and main features of the product can be very helpful. For some of the products, manufacturers provides a detailed video, but for many products, images are primary way to describe the product. However there are customers who post reviews of the products on video sites such as YouTube® etc. System 200's matching algorithms analyze video metadata (such as, inter alia: title, description, comments etc.) to associate the product video with the product.

Methods of accurate size recommendation of clothing based on analyzing the size data are now provided. Clothing sizes are often determined by brands and manufacturers based on various parameters. Brands often have several criteria including marketing to come up with the size availability of a clothing. There is currently no universally agreed upon size compatibility which makes shopping for a clothing very inefficient for consumers. Size "xs" of one brand is often equal to the size "m" of another brand. Customers may have to try multiple sizes of brands before finding the right fit of the clothing of that particular brand. For children's clothing, this problem is more amplified as children are growing continuously and clothing needs to be changed more often than for adults. Trying out different sizes of the clothes is not an easy option when shopping for children. System 200 helps solve this problem by analyzing the sizes of the clothing of different brands and/or automatically recommending the right set of clothing and the brands to purchase for the child. System 200 can receive input from the user such as the current age, height/weight of the child and the dresses/shoes that the child is currently wearing. Based on these parameters, the system then recommends the right set of clothing/shoes and brands for the child taking into account the growth of the child. This type of recommendation system is also applicable to adult clothing/shoes.

Figure 3:
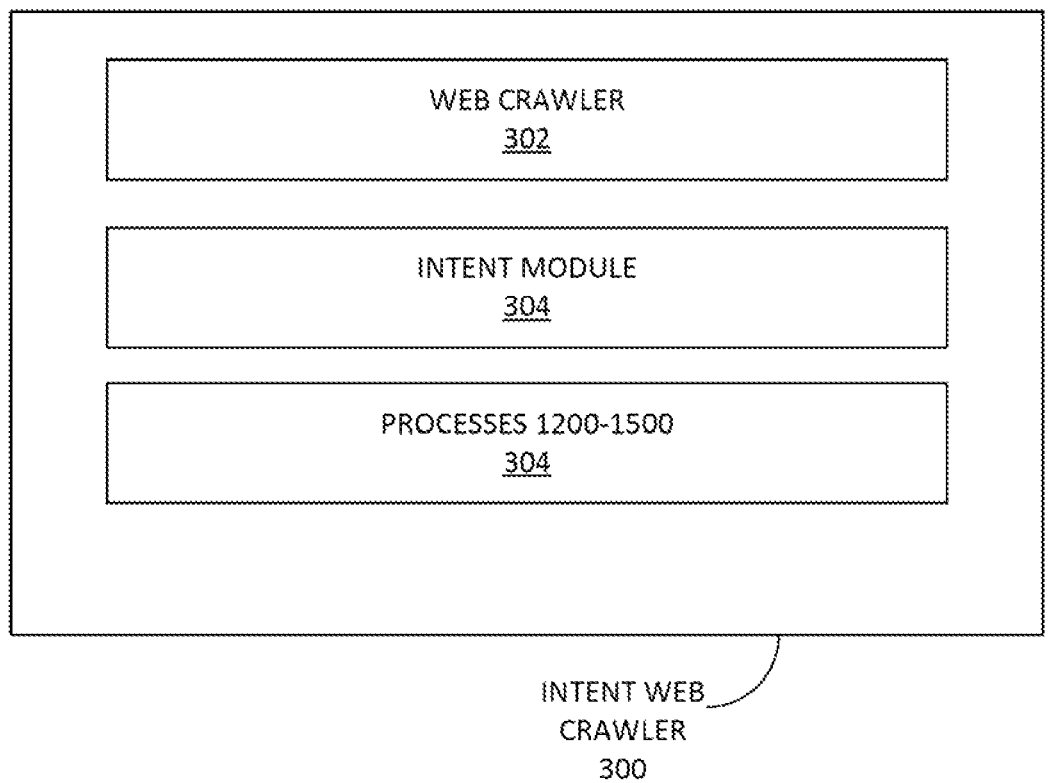
FIG. 3 illustrates an example intent web crawler, according to some embodiments.

FIG. 3 illustrates an example intent web crawler 300, according to some embodiments. Intent web crawler 300 can extract various shopping intents from unstructured data crawled over various data sources on the web. Intent web crawler 300 can include a web crawler 302 that crawls various unstructured and structured data sources including blog articles, forum questions and product reviews. Intent web crawler 300 can include an intent module 304. Intent module 304 can use processes 306 provided herein (e.g. processes 200 and/or 1200-1500) to determine users' shopping intent. Intent web crawler 300 can be stored in computer memory (e.g. in a cloud-computing platform).

Figure 4:
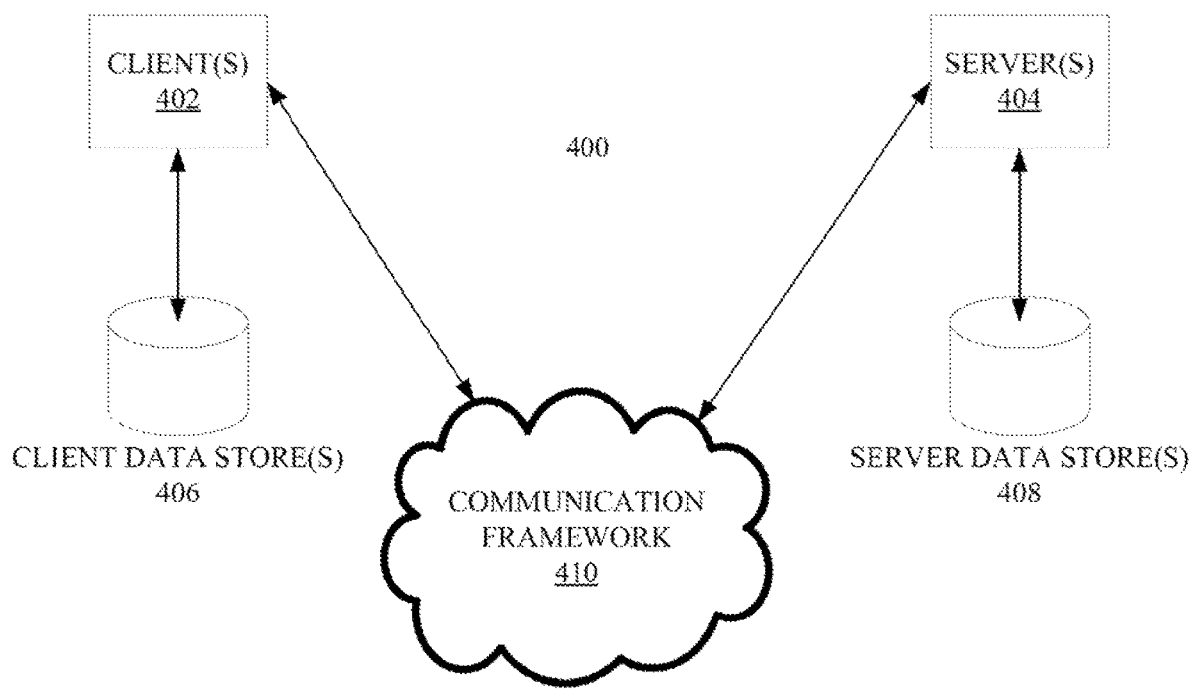
FIG. 4 is a block diagram of a sample computing environment that can be utilized to implement some embodiments.

FIG. 4 is a block diagram of a sample computing environment 400 that can be utilized to implement some embodiments. The system 400 further illustrates a system that includes one or more client(s) 402. The client(s) 402 can be hardware and/or software (e.g., threads, processes, computing devices). The system 400 also includes one or more server(s) 404. The server(s) 404 can also be hardware and/or software (e.g., threads, processes, computing devices). One possible communication between a client 402 and a server 404 may be in the form of a data packet adapted to be transmitted between two or more computer processes. The system 400 includes a communication framework 410 that can be employed to facilitate communications between the client(s) 402 and the server(s) 404. The client(s) 402 are connected to one or more client data store(s) 406 that can be employed to store information local to the client(s) 402. Similarly, the server(s) 404 are connected to one or more server data store(s) 408 that can be employed to store information local to the server(s) 404.

FIG. 4 is provided by way of example, in other embodiments, the methods and systems provided herein can be implemented in cloud-computing environments such as the Amazon.com's® cloud-computing services For example, system 200 can be implemented as a virtual machine(s) in a cloud-computing environment.

Figure 5:
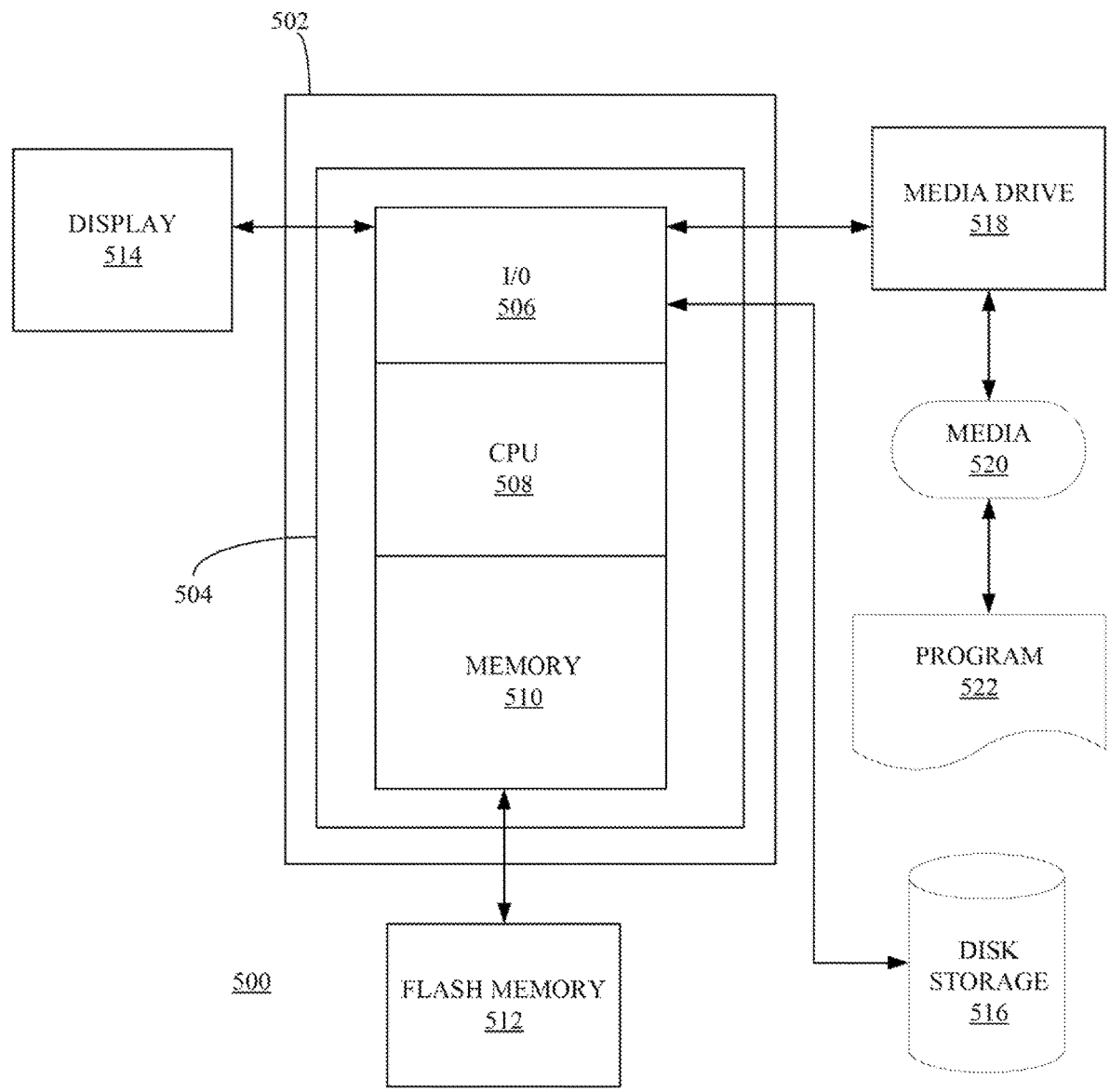
FIG. 5 is a block diagram of a sample computing environment that can be utilized to implement various embodiments.

FIG. 5 depicts an exemplary computing system 500 that can be configured to perform any one of the processes provided herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing units (CPU) 508, and a memory section 510, which may have a flash memory card 512 related to it. The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Bluetooth® (and/or other standards for exchanging data over short distances includes those using short-wavelength radio transmissions), USB, Ethernet, cellular, an ultrasonic local area communication protocol, etc.

Figure 6:
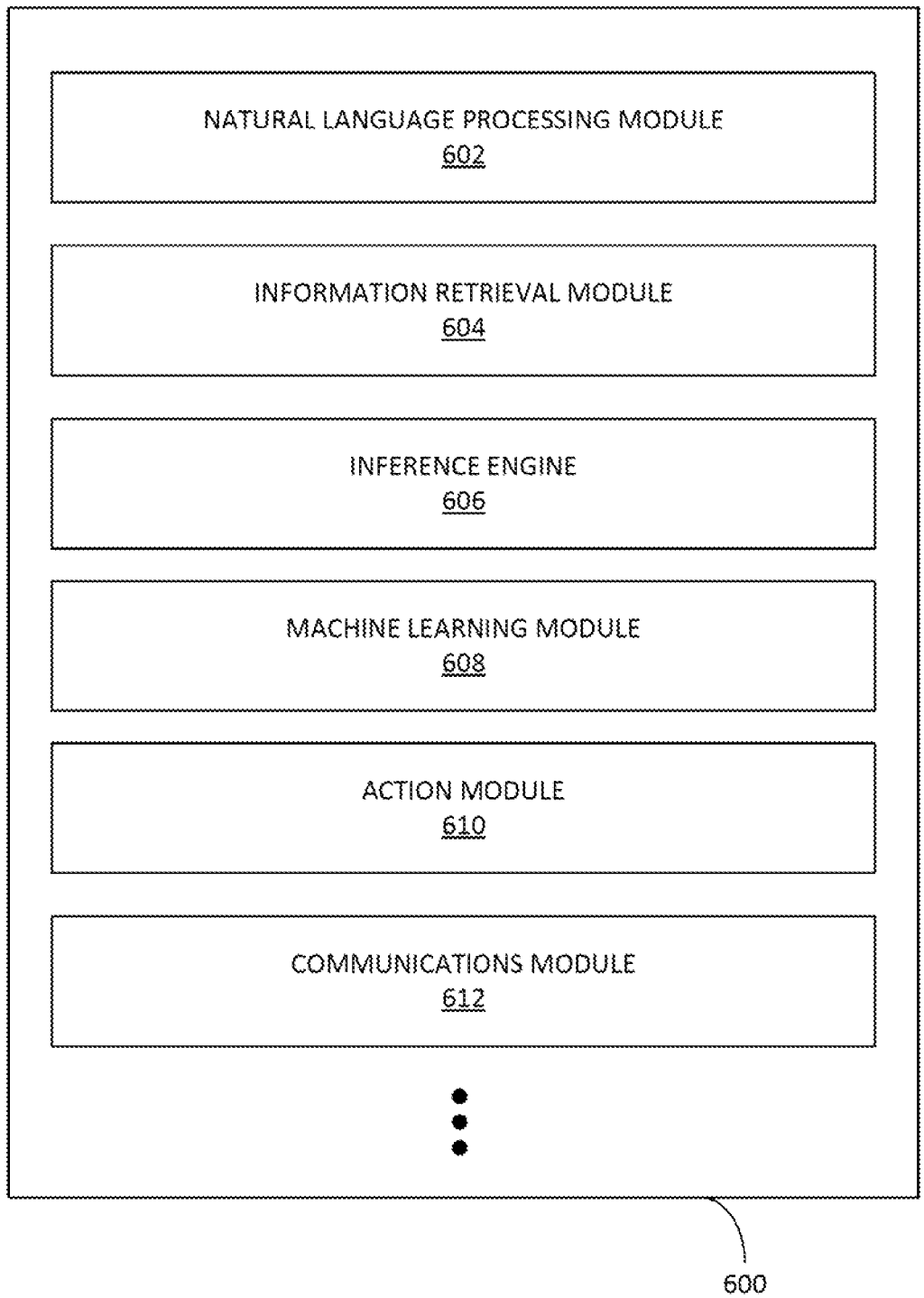
FIG. 6 is an example computerized automated product-recommendation manager, according to some embodiments.

FIG. 6 an example computerized automated product-recommendation manager 600, according to some embodiments. Product-recommendation manager 600 can implement any automated product-recommendation method provided herein. Product-recommendation manager 600 can search the content of databases (e.g. the data sources provided in FIG. 2 supra) and obtain extract list items and/or metadata about said list items. Products recommendation manager 600 can determine a priority of the product (e.g. parameters provided supra, etc.). Product-recommendation manager 600 can implement process 100. Product-recommendation manager 600 can be implemented in system 200. In various embodiments, product-recommendation manager 600 can be implemented on the cloud, in a server, in a virtual machine, in a client-side application and/or any combination thereof.

For example, product-recommendation manager 600 can include a natural language processing (NLP) module 602. NLP module 602 can implement natural language understanding, part-of-speech tagging, parsing, relationship extraction, entity extraction and/or other NLP algorithms for interpreting an incoming user-generated texts.

Product-recommendation manager 600 can include information retrieval module 604. Information retrieval module 604 can search various data sources and obtain information relevant to a user's product-recommendation list. Information retrieval module 604 can include a search-engine functionality. Information retrieval module 604 can also obtain information from various third-party sources (e.g. Google® search, online social network websites, news websites, online social networks, etc.).

Product-recommendation manager 600 can include an inference engine 606. Inference engine 606 can draw conclusions by analyzing database content in light of a database of expert knowledge it draws upon inference engine 606 can reach logical outcomes based on the premises the data establishes. Inference engine 606 can also utilize probability calculations to reach conclusions that the knowledge database doesn't strictly support, but instead implies. In one example, inference engine 606 can cycle through three sequential steps: match rules, select rules, and execute rules. The execution of the rules can result in new facts or goals being added to the knowledge base which can cause the cycle to repeat. This cycle can continue until no new rules can be matched. Accordingly, a product item and its attributes can be generated and refined.

Machine learning module 608 can learn from previous user behavior with respect to previously provided products. This can be used to increase the accuracies of later extracted list items. Action module 610 can enable a user to take actions on information provided in a product (e.g. purchase product online, arrange for delivery of the product as a gift, etc.).

Communications module 612 can interact with application programming interfaces (API) of other entities and/or various systems within an enterprise (e.g. human resources database, sales portal, etc.) to obtain information. Communications module 612 can interact with mobile-side client applications. Communications module 612 can obtain information from the other modules of and compose natural languages messages (e.g. emails, text messages, push notifications, augmented-reality messages, pop ups, list item text, etc.) to users. Accordingly, communications module 612 can include various human language Natural Language Generation (NLG) functionalities and/or human-language translations functionalities. Communications module 612 can also implement various context awareness methods to determine a user's current context (e.g. location, enterprise context such as position in an enterprise, calendar information, etc.).

Product-recommendation manager 600 can include other functionalities (not shown). For example, product-recommendation manager 600 can include a user-subscription manager, user-authentication manager, scheduling/calendar interface modules, product-recommendation search, categories and filters, user registration and membership managers, etc.

Example User Interfaces

Figure 7:
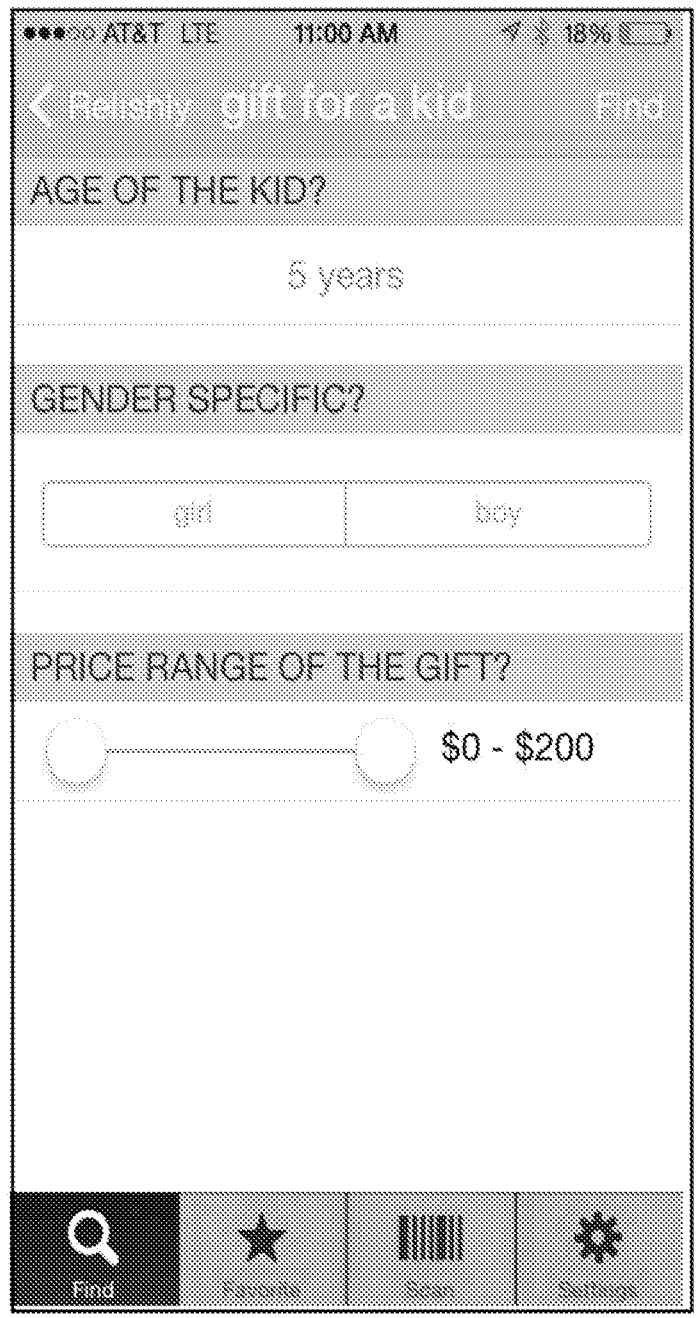
FIG. 7 depicts an example user interface displayed on a mobile device, according to some embodiments.
Figure 8:
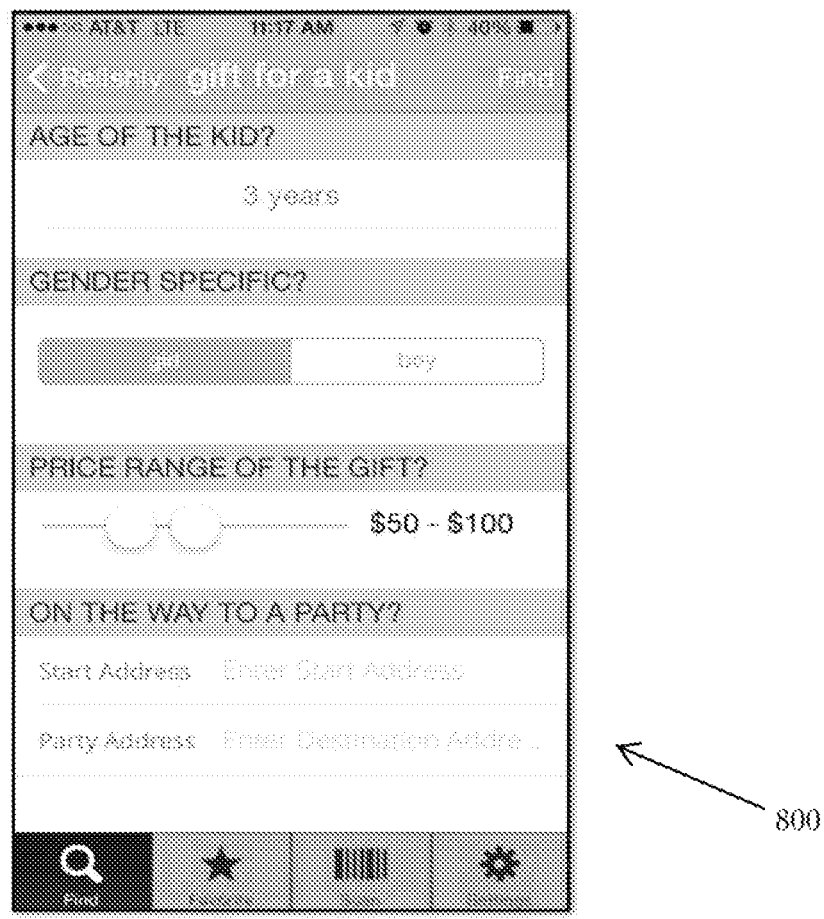
FIG. 8 depicts another example user interface displayed on a mobile device, according to some embodiments.
Figure 9:
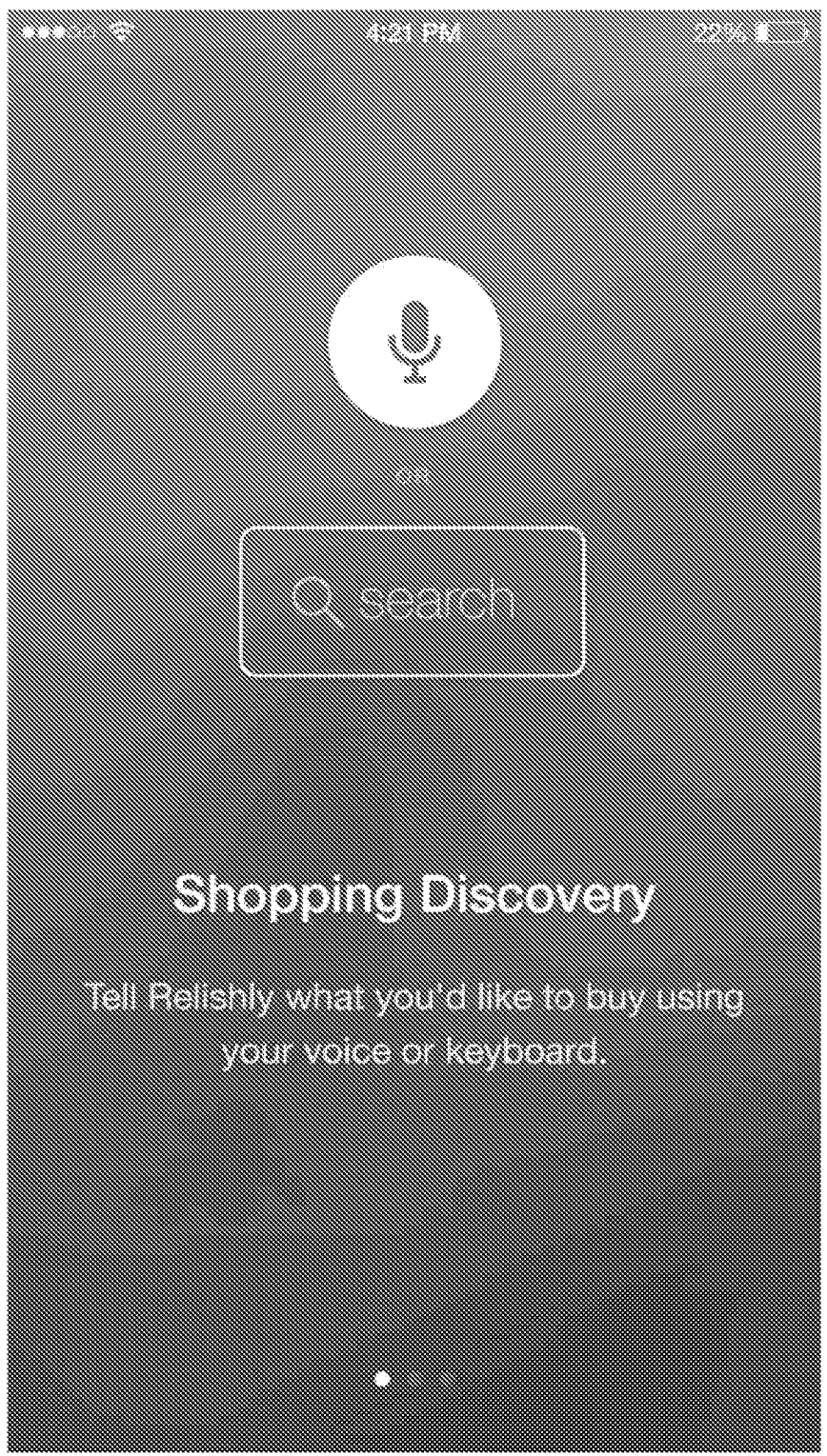
FIG. 9-11 illustrates additional example user interfaces, according some embodiments.
Figure 10:
Figure 11:
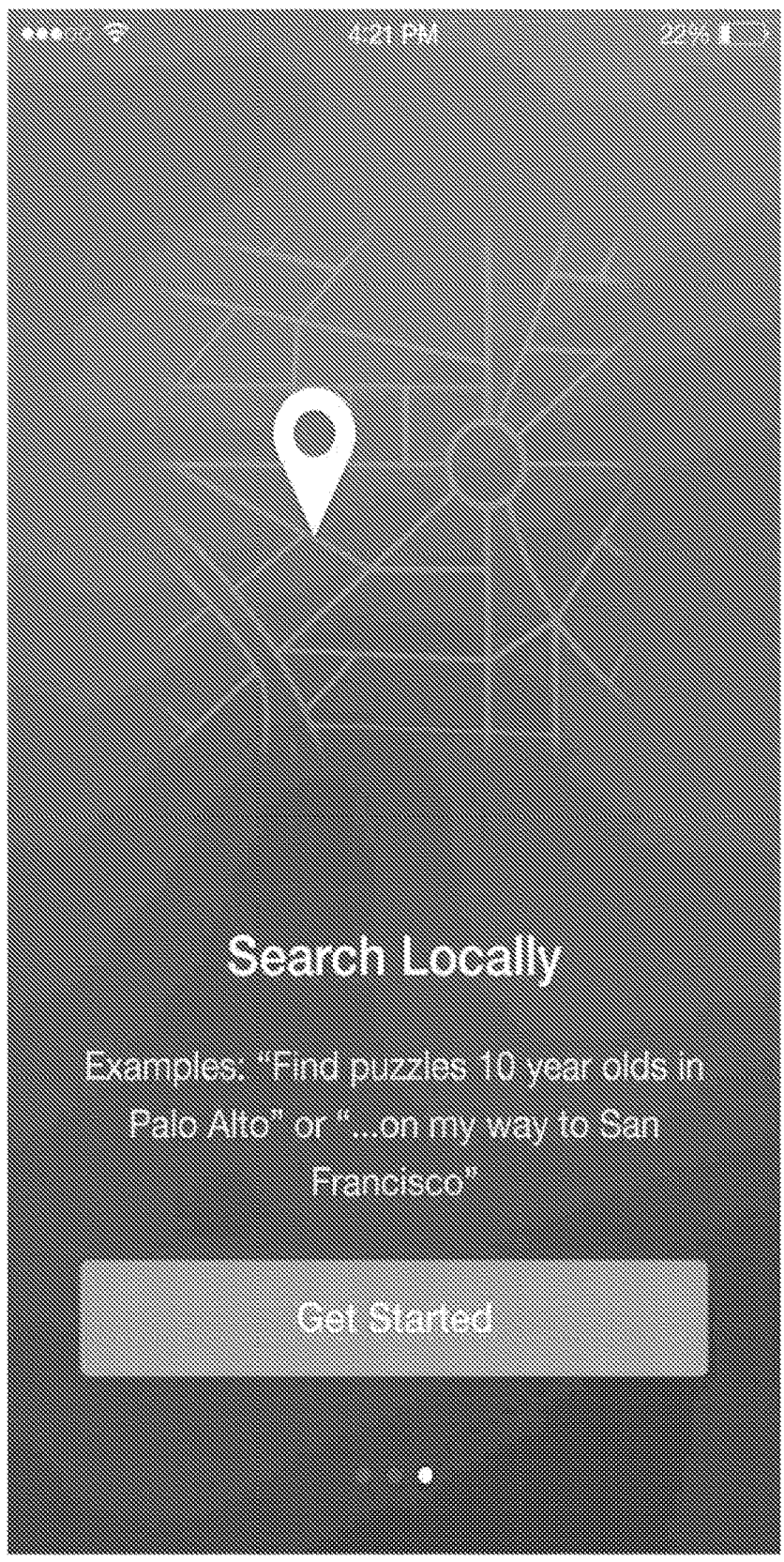

FIG. 7 depicts an example user interface 700 displayed on a mobile device, according to some embodiments. UI 700 includes a screen shot of a sample flow for a "gift for a kid" example. This is provided by way of example and not of limitation. FIG. 8 depicts another example user interface 800 displayed on a mobile device, according to some embodiments. FIG. 9-11 illustrates additional example user interfaces 900-1100, according to some embodiments.

Additional Processes

Figure 12:
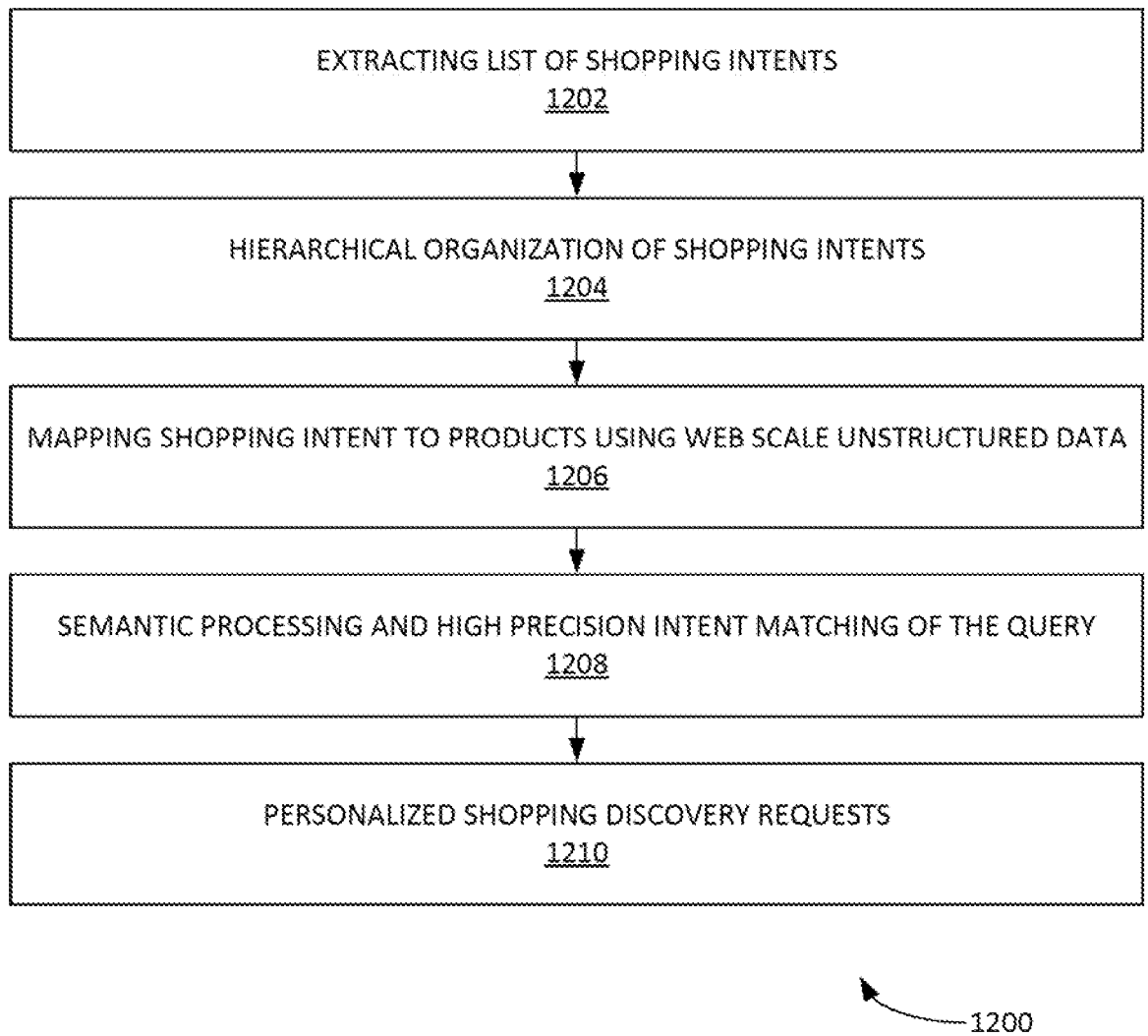
FIG. 12 illustrates an example process for assisting a user in a real-life shopping situations, according to some embodiments.

FIG. 12 illustrates an example process 1200 for assisting a user in a real-life shopping situations, according to some embodiments. Process 1200 can be used to assist a user in a real-life shopping situation. Process 1200 can organize indexes of products according to these real-life shopping situations. Process 1200 can detect various possible shopping intents and associate them with relevant products. In one example, in step 1202, process 1200 can extract a list of shopping intents. In step 1204, process 1200 can implement a hierarchical organization of shopping intents. In step 1206, process 1200 can map a shopping intent to products using web scale unstructured data. In step 1208, process 1200 can implement semantic processing and high precision intent matching of the query. In step 1210, process 1200 can provide personalized shopping discovery requests.

An example of extracting a list of shopping intents (e.g. step 1202) is now provided. Whereas there are general shopping intents surrounding product types/categories (e.g. "buy oven gloves"), process 1200 can detect more specific shopping intents that describe more accurately the shopping situation (e.g. the context) of the user's purchase. Some example shopping intents can be, inter alia: "oven gloves that are long enough to cover elbows"; "cook baby food in hotel during vacation"; "prom dresses that hide belly fat", etc. At any point of time $\{S_i\}$ can be the list of existing shopping intents. The classification of forum questions and blog articles can be represented as SHOPPING_INTENT and OTHER_INTENT classes. Process 1200 can perform feature extraction of keyword tokens. Process 1200 can also perform classification using a supervised machine learning classifier using the feature set to classify the forum question as shopping intent and non-shopping intent types. Process 1200 can analyze the forum questions and blog articles which are classified as SHOPPING_INTENT. Process 1200 can implement the extraction of phrasal expression/concepts as potential shopping intents. Each phrasal expression that is extracted as potential shopping intent can be provided the following weights/scores: $W_b$ (normalized confidence score based on several factors including how frequently it appeared in blogs) and $W_f$ (normalized confidence score based on several factors including how frequent it appeared in forums). Each product P can then be associated with phrasal expressions extracted in the following manner.

For each of the product reviews that are associated with a product P a score is computed based on the relevancy of each phrase. Natural language processing and phrase level analysis can be performed on the review text to determine if any of the shopping intents supra are matched. For example, if a specific product review mentions that "this dress helped hide the belly fat" relevancy score of the intents that are associated with "dress" and "hide bell fat" can be increased. In this manner, an aggregate relevance score $W_r$ can be computed across products and product reviews. For the shopping intents, a confidence score can be computed based on a weighted function of $F(W_b, W_f, W_r)$. Those shopping intents which are greater than a threshold 't' are interpreted as valid shopping intents and are then farther processed.

Figure 13:
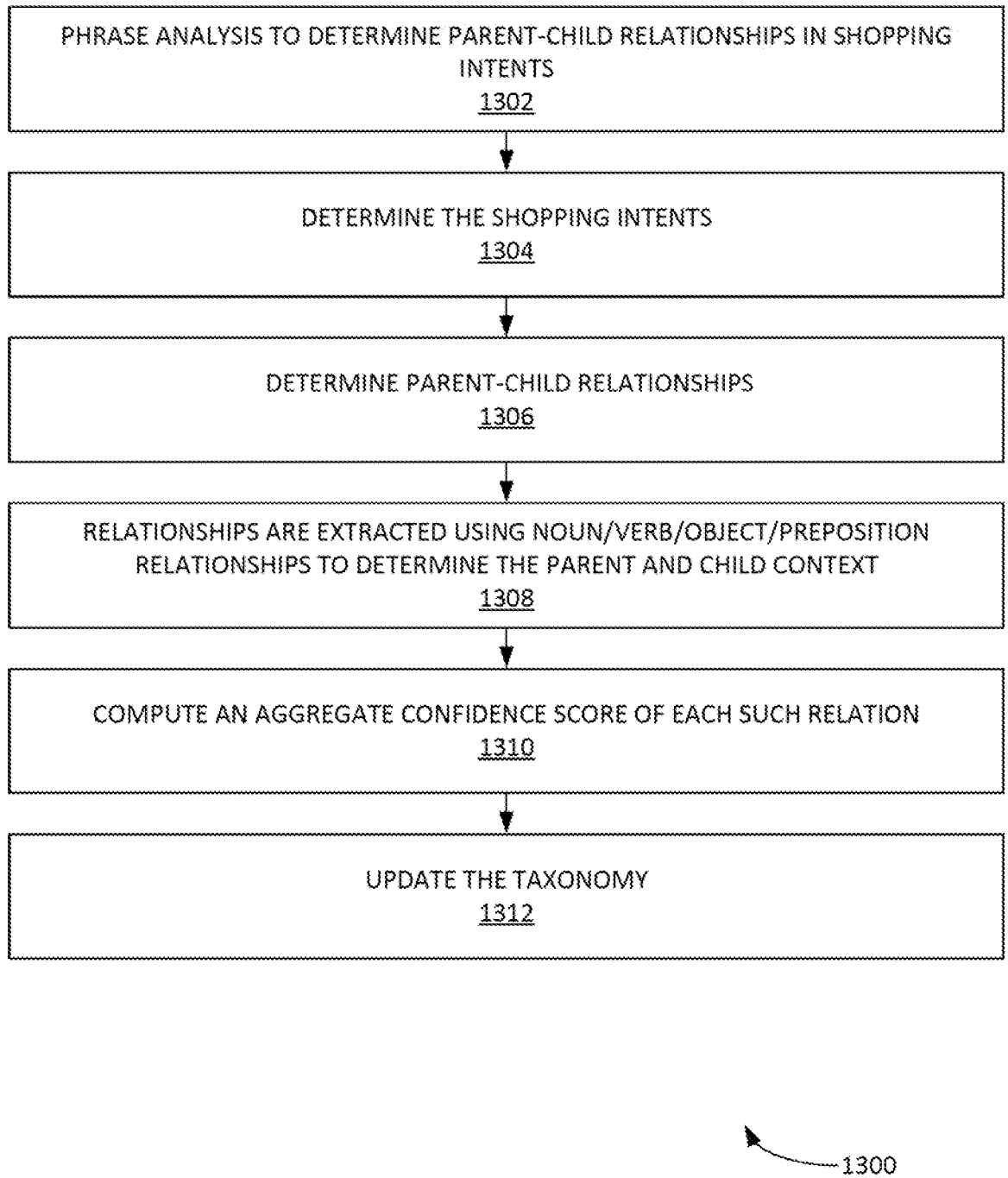
FIG. 13 is an example implementation of hierarchical organization of shopping intents, according to some embodiments.

An example of hierarchical organization of shopping intents (e.g. step 1204) is now provided. Process 1200 can extract the shopping intents in the list and further process them into perform hierarchical organization. Process 1200 can implement process 1300 of FIG. 13 as an example implementation of hierarchical organization of shopping intents. In step 1302, process 1300 can conduct phrase analysis to determine parent-child relationships in shopping intents. Step 1302 can capture parent-child relationships for those shopping intents (e.g. "oven gloves for long arms" and "oven gloves with fingers") are both associated as specific shopping intents of "oven gloves". In step 1304, natural language processing and dependency relationships are analyzed within the shopping intents to determine the shopping intents. Step 1304 can determine parent child relationships of shopping intents where there are no commonalities in the phrases. For example, using this approach the shopping intent "cook baby food in hotel" is able to be associated as a sub-shopping intent of "traveling on vacation". Step 1306 can determine parent-child relationships. For a given set of text that is associated with product, possible shopping intents are matched (e.g. from reviews, blogs, forum questions, answers, etc.). In step 1308, for each of the shopping intents extracted, relationships are extracted using noun/verb/object/preposition relationships to determine the parent and child context. For each such relationship a confidence score Cr is computed. Each product review or blog article or comment is processed as in step 2 to determine the confidence score. In, step 1310, process 1300 aggregates confidence score of each such relation that is computed. In step 1312, all such extracted parent-child relations with a confidence score that is greater than the threshold 't' can be updated in the taxonomy.

Figure 14:
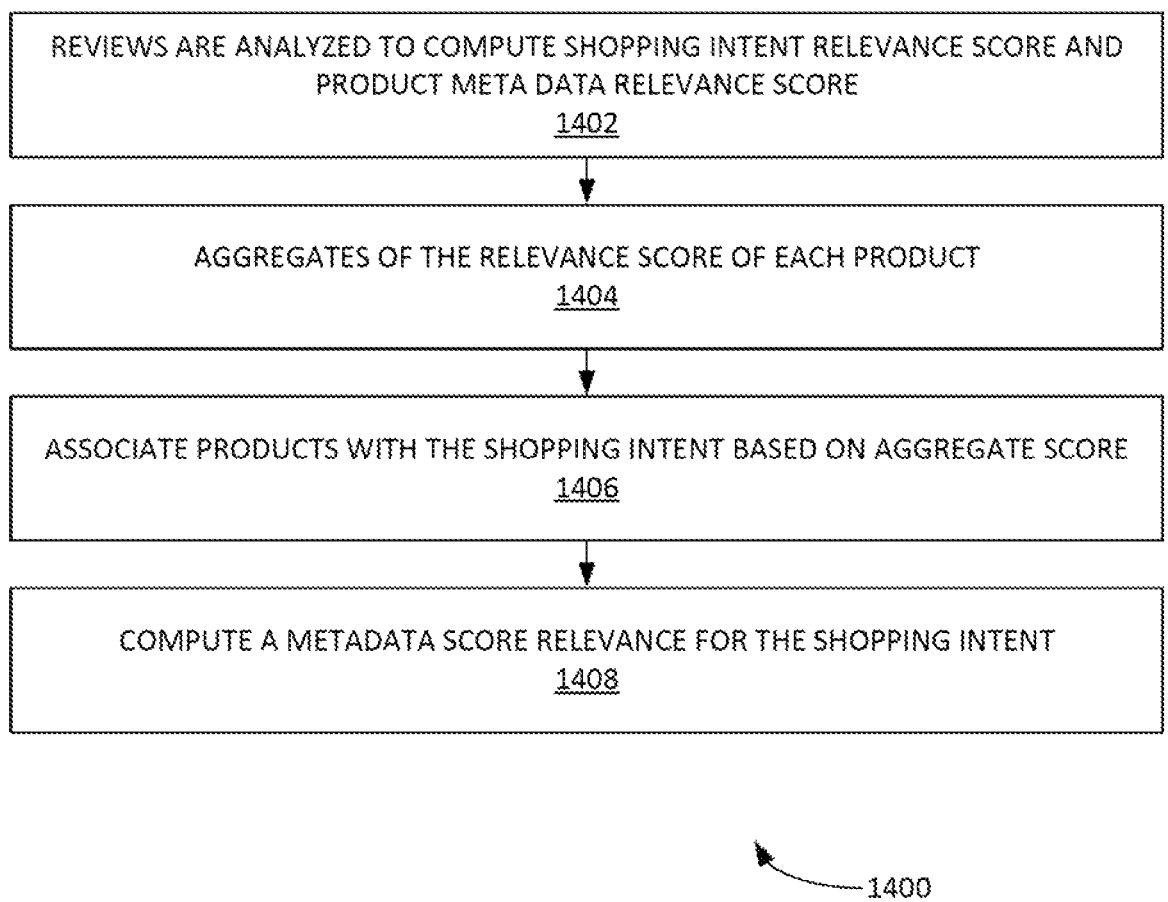
FIG. 14 illustrates an example process of mapping shopping intent to products using web scale unstructured data, according to some embodiments.

FIG. 14 illustrates an example process 1400 of mapping shopping intent to products using web scale unstructured data (e.g. using step 1206), according to some embodiments. Each shopping intent can be mapped to products by associating it to products and associated metadata. For example, for the shopping intent "oven gloves that are long enough to cover elbows", process 1400 can associate with strong confidence products that have metadata of "glove length: 24 inch". In some examples, process 1400 can implement the following steps to, associate products and corresponding metadata to the shopping intent. In step 1402, for a given product 'P' corresponding product, reviews are analyzed to compute shopping intent relevance score and product metadata relevance score in conjunction with shopping intent. $S_{ip}$ can be the relevancy of product P with respect to shopping intent $S_i$. $M_{ij}$ can be the relevancy of metadata $M_j$ with respect to shopping intent $S_i$. Step 1402 can be repeated for the list of all products. Similar scores can also be computed in processing blog articles and forum questions/answers.

In step 1404, process 1408 aggregates the relevance score of each product is computed across product reviews/blogs/forums. In step 1406, products that have an aggregate score confidence greater than threshold 't' can then be associated with the shopping intent In step 1408, process 1400 computes a metadata score relevance for the shopping intent. Metadata mapping to shopping intent can be used when new products are released in the market. For example, when there are not enough blogs/reviews/forum discussion to help determine the relevance. In this context, metadata relevance can be used. For example, as metadata "glove length: 24 inches" can have a strong confidence score associated with the intent "oven gloves that are long enough to cover elbows" the oven gloves with "glove length: 24 inches" can be confidently recommended by the system for that intent. For example, for the shopping intent "prom dresses that hide belly fat" can be metadata extracted by process 1400. This metadata can be strongly associated with that shopping intent, inter alia: dress style: empire waist; dress neck style: v-neck; dress style: wrap dress; and/or dress features: pleated.

Figure 15:
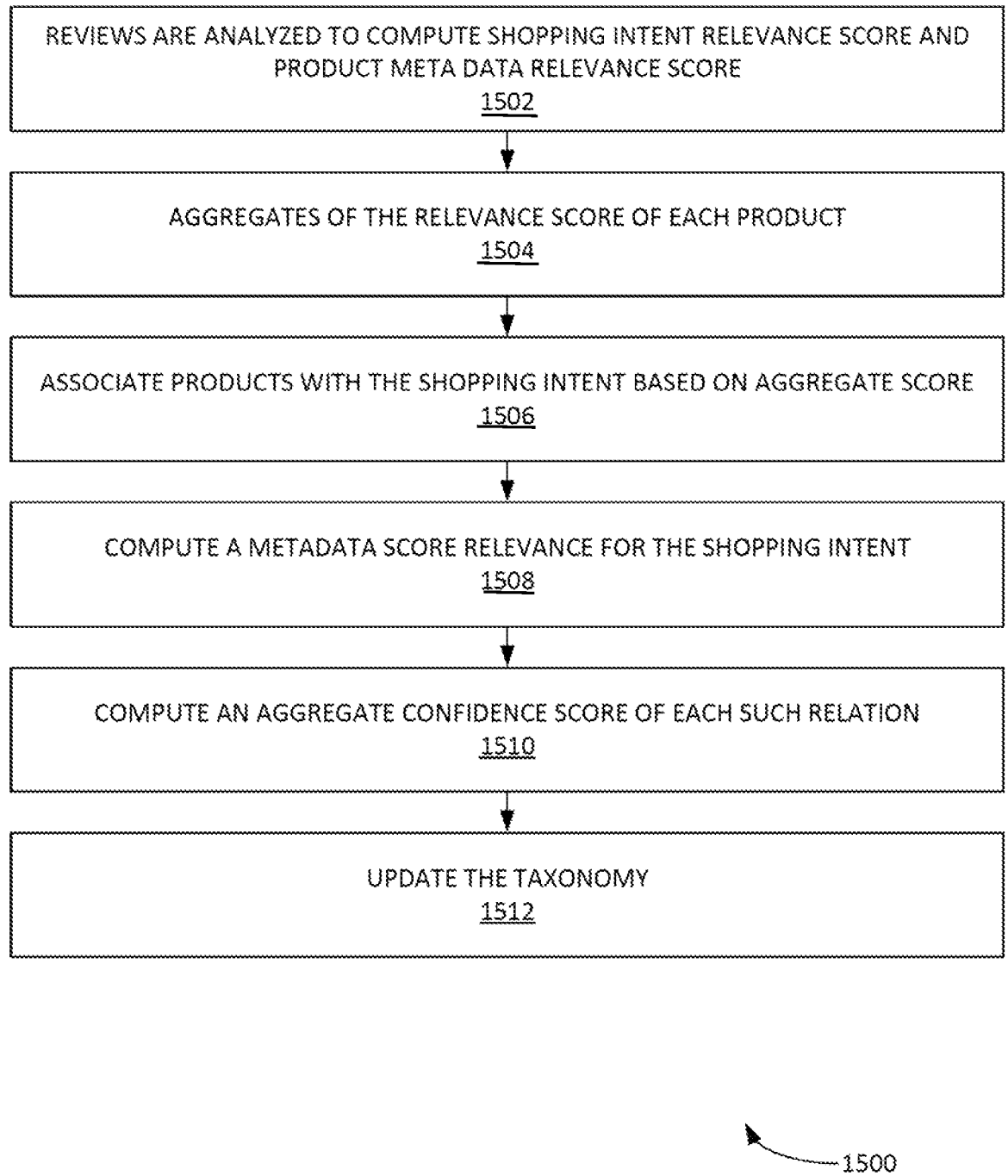
FIG. 15 illustrates an example process that analyzes and breaks down a search query into series of shopping intents and computes the ranking of products based on the relevancy score, according to some embodiments.

An example of semantic processing and high precision intent matchings of the query (e.g. as provided in step 1208) is now provided. For example, FIG. 15 illustrates an example process 1500 that analyzes and breaks down a search query into series of shopping intents and computes the ranking of products based on the relevancy score, according to some embodiments. Process 1500 can processes the query and matches the input request to various shopping intents that it has already organized the products against. Process 1500 can organizes the products not just based on product attributes but also on real life shopping attributes like in this case "make appearance taller", where the system is able to give high precision results that match the specific shopping intent that the user is looking at. In the specific example of FIG. 15, "dresses to wear for a summer wedding reception that make me look taller and are under 100 dollars" can be received as a query in step 1502. In step 1504, process 1500 implements a semantic processing engine (e.g. NLP, artificial intelligence (AI), graph analysis, etc.). In step 1506, process 1500 implements shopping intent matching. For example, the following intent can be matched: wear at wedding reception; wear in summer; dresses that make appearance taller. In step 1508, process 1500 can implement product ranking according to intent and price/availability filters. In step 1510, process 1500 can generate and provide a list of products.

An example of personalized shopping discover requests (e.g. step 1210 of process 1200) in now provided. In order to enhance user experience, the user could provide more information to process 1200 including, inter cilia: past purchases, personal preferences (e.g. color etc.), physical attributes (e.g. body height, shape etc.), location, home details, other family members details (e.g. age etc.). These details can also be extracted by a combination of several methods including user explicit and automatically extracted from user data sources like email etc. Process 1200 can provide enhanced experience to the user with such maintenance of profile. For example, if user provided information about a family member "Rob" who is aged seven "7" year old. The system could automatically process requests like "show me some toys that help Rob improve his math skills". Similarly the user could ask requests such as, inter alia: "reorder diapers for Janet"; "dresses that go well with cowboy boots I bought last week"; "show me some good strollers that can fit in the back of my Honda car".

An example of an interactive shopping discovery experiences is now provided. Multiple in active experiences to help assist the user in effective ways can be provided to find the relevant products. For example, when the user is not able to use keyboard and/or if the user is using a wearable device where there is no keyboard, the system can respond back using voice describing about the products and product results in a compact way. As process 1200 can be intelligence driven, the user would be able to go back and forth with the system using voice to refine the products according to his/her desire. Some situations where process 1200 can be expected to be used.

An in-car example is now provided. Apart from interacting using mobile or wearable device when traveling in the car, process 1200 can be integrated with car dashboard to provide a hands free discovery experience for the user to find the appropriate products. For example, if the user is driving to attend a birthday party and needs to find a gift on the way, the user can interact with the system implementing process 1200 to find relevant gifts on the way. Process 1200 can then automatically take the destination address and find relevant products in stores. Process 1200 can then describe the product results by responding using a combination of voice and displaying products on the car mirror/dashboard in a manner which is safe when the user is driving. The user can respond back to the system with any refinements and finally can decide to purchase a specific product. The system implementing process 1200 (and/or other processes provided herein) can also be used in conjunction to voice detection to authenticate a voice-based authentication to, purchase the product on his/her behalf and to have the product ready to be picked up when he/she is at the store.

A virtual-reality based experience is now provided. A shopping discovery assistant can be integrated to offer enhanced virtual reality based experiences. Users can explore department stores or malls from the comfort of home using virtual reality. Semantic technology can be used by a computer system implementing process 1200 to enable the user to interact with the virtual reality system using voice and hand interactions to explore the products based on the user's shopping intents.

An example interaction with wearable devices example is now provided. The system implementing process 1200 can enable users to discover appropriate products using voice. A conversational based Interface for the user to interact example is now provided. In another scenario the user may be in a public place and cannot use voice for the sake of privacy. In this case, the system could act as a conversational chat agent that interacts with the user using keyboard and help find the products in an easy and effective manner. In another scenario the user may send a text message to the system to help recommend the right products. The system implementing process 1200 can then interact with the user back and forth to help user find the appropriate products.

An in-store kiosks and virtual dressing room assistant example is now provided. Users can use process 1200 to find relevant products in a store. A system implementing process 1200 can integrated in a dressing, room within a store to offer enhanced experience for the user to find the appropriate clothing personalized to the user and matches the shopping intent the user is shopping for. In another example, process 1200 can enable the merchant to have the clothing or other products ready based on the user's preference/style so that the user can save time in finding the right products.

An example combination of image and video sensors as system inputs example is now provided. Data analysis can be extended to analyze image and video data and can help user to more effectively assist the user in helping find the right products. For example, if the user is shopping for a baby gate that goes on the stairs, the user may need to measure the openings near stairs to find the appropriate gate that fits in the space. Process 1200 can enable a user to use the phone/video to show the space where the baby gate is to be placed. Using computer vision and machine learning approaches, a system implementing process 1200 can automatically determine the measurements of that space and then suggests the best baby gates that could go on the stairs. In another scenario if the user requests to find good sofa that goes well with the color and look of the home, a system implementing process 1200 can prompt the user to show the video of the region where the sofa would need to be placed. A system implementing process 1200 can then perform analysis of the video data to determine the appropriate sofas that go well with the décor.

A contextual platform for shopping example is now provided. A system implementing process 1200 can be integrated with multiple third party apps or services. For example, if there is a birthday invitation email that arrives to the user, a system implementing process 1200 can automatically determine the context of the email and recommend the appropriate gifts to buy and give various purchase options depending on how soon the user needs the product. In another scenario the user is reading a recipe on an application, the system implementing process 1200 can understand the context, extracts the ingredients and helps user effectively purchase ingredients. In another scenario the technology can be integrated with content/blog articles or websites where users are asking for advice in discovering products.

Recommendations can be based on when the user needs the product. For example, along with various other factors a system implementing process 1200 can optimize the results based on how soon the user needs the product. In another scenario the user might be in a critical time situation and needs to make multiple requests from various stores based on the shopping intent. For example, if a user is, going on a camping trip and would need to make various purchases in the last minute, the system determines the various things that need to be purchased from various stores. The system can optimize the route and the number of stores the user has to go to make the purchases. The system implementing process 1200 can also optimize the route within the store so as to make various purchases within a short amount of time.

A computerized system useful in serving web pages offering commercial opportunities, the system comprising; (a) a computer store containing data, for each of a plurality of first web pages, defining a plurality of visually perceptible elements, which visually perceptible elements correspond to the plurality of first web pages; (i) wherein each of the first web pages belongs to one of a plurality of web page owners; (ii) wherein each of the first web pages displays at least one active link associated with a set of products associated with a buying opportunity of a selected one of a plurality of merchants; and (iii) wherein the computer store further comprises an extracted a list of shopping intents of a plurality of users; (b) a computer server, which computer server is coupled to the computer store and programmed to: (i) receive from the web browser of a computer user a signal indicating a product search query; (ii) parse the product search query; (iii) match the product search query with at least one shopping intent extracting from the list of shopping intents in the computer store, (iv) hierarchically organize the list of shopping intents; (v) mapping a shopping intent to one or more products using a set of web-scale unstructured data, wherein the web-scale unstructured data comprises a set of extracted shopping intents from unstructured data automatically obtained from a set of data sources on the world wide web by an intent web crawler functionality that crawls one or more multiple web sources; (vi) use a matched product search query and at least one shopping intent to obtain a set of products to return as a search result; (vi) automatically identify as the source page the one of the first web pages on which the set of products to return as a search result is included; (iii) in response to identification of the source page, automatically retrieve the stored data corresponding to the source page; and (iv) using the data retrieved, automatically generate and transmit to the web browser a second web page that displays; (A) information associated with the set of products to return as the search result, and (B) the plurality of visually perceptible elements visually corresponding to the source page.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized system useful in serving web pages offering commercial opportunities, the system comprising:
    (a) a computer store containing data, defining for each of a plurality of first web pages, which visually perceptible elements of a plurality of visually perceptible elements corresponds to each of the plurality of first web pages;
        (i) wherein each of the first web pages belongs to one of a plurality of web page owners;
        (ii) wherein each of the first web pages displays at least one active link associated with a set of products associated with a buying opportunity of a selected one of a plurality of merchants, wherein the set of products comprises a set of clothing products: and
        (iii) wherein the computer store further comprises an extracted a list of shopping intents of a plurality of users;
    (b) a computer server coupled to the computer store and programmed to:
        (i) receive from a web browser of a user a signal indicating a product search query;
        (ii) parse the product search query;
        (iii) match the product search query with a shopping intent extracted from the list of shopping intents in the computer store;
        (iv) hierarchically organize the list of shopping intents;
        (v) mapping the shopping intent to one or more products using a set of web-scale unstructured data, wherein the web-scale unstructured data comprises a set of extracted shopping intents from unstructured data automatically obtained from a set of data sources on the world wide web by an intent web crawler functionality that crawls multiple web sources;
        (vi) use a matched product search query and the shopping intent to obtain the set of products to return as a search result;
        (vii) automatically identify a source page as one of the plurality of first web pages, which includes the set of products to return as the search result;
        (iii) in response to identification of the source page, automatically retrieve a stored data corresponding to the source page; and
        (iv) using the stored data retrieved, automatically generate and transmit to the web browser a second web page that displays:
            (A) information associated with the set of products to return as the search result, and
            (B) the plurality of visually perceptible elements visually corresponding to the source page;
        (v) receive a list of past user purchases, a list of personal preferences, a list of physical user attributes, a user location, a list of home details, and a list of details about other family members of the user;
        (vi) analyze the sizes of a set of clothing of different brands; and
        (vii) automatically recommending a set of clothing and brands to purchase based on analyzing the sizes of the set of clothing of different brands.

2. The computerized system of claim 1, wherein a websource comprises an online review, on line comment, an online web blog, and an online article.

3. The computerized system of claim 2, wherein the websource is integrated into a web page document.

4. The computerized system of claim 1, wherein the search result comprises a personalized shopping discovery requests.

5. The computerized-system of claim 4, wherein the computer server is programmed to: render the set of products to return as the search result in a format for communication a search-results web page to a remote computing device.

6. The computerized-system of claim 5, wherein, the computer server is programmed to: store the list of past user purchases, the list of personal preferences, the list of physical user attributes, the user location, the list of home details, and the list of details about other family members in a memory.

7. The computerized-system of claim 6, wherein the list of past user purchases, the list of personal preferences, the list of physical user attributes, the user location, the list of home details, and the list of details about other family members of the user are automatically extracted from a user-data source.

8. The computerized-system of claim 7, wherein the user data source comprises a user's historical email documents.

9. The computerized-system of claim 8, the computer server is programmed to:
    determine a location of the event or party; and
    based on the current location of the user and the travel route from the current location of the user to the location of the event or the party and directions,
    determine retail stores and a product for the user to purchase en route to the event or the party.

10. The computerized-system of claim 9, wherein the list of shopping intents is extracted from the multiple web sources.

11. The computerized-system of claim 10, wherein the multiple web sources comprises an e-commerce web site product review text, a web page comment, a web blogs, and a web page article text.

* * * * *